(12) United States Patent
Robinson

(10) Patent No.: US 7,924,341 B2
(45) Date of Patent: Apr. 12, 2011

(54) OPTICAL SUBSYSTEM WITH DESCRIPTORS OF ITS IMAGE QUALITY

(75) Inventor: M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 1047 days.

(21) Appl. No.: 11/447,369

(22) Filed: Jun. 5, 2006

(65) Prior Publication Data

US 2007/0279513 A1 Dec. 6, 2007

(51) Int. Cl.
*G02B 13/16* (2006.01)
*G02F 1/03* (2006.01)

(52) U.S. Cl. .................. 348/335; 359/245; 359/249

(58) Field of Classification Search ............ 348/195, 348/335; 359/245, 249, 386, 392, 822
See application file for complete search history.

(56) References Cited

U.S. PATENT DOCUMENTS

| | | | |
|---|---|---|---|
| 5,023,656 A * | 6/1991 | Terashita | 355/41 |
| 5,227,890 A | 7/1993 | Dowski | |
| 5,266,989 A * | 11/1993 | Okano et al. | 396/60 |
| 5,521,695 A | 5/1996 | Dowski | |
| 5,713,053 A * | 1/1998 | Hirai | 396/92 |
| 5,748,371 A | 5/1998 | Cathey | |
| 5,870,179 A | 2/1999 | Cathey | |
| 6,021,005 A | 2/2000 | Cathey | |
| 6,069,738 A | 5/2000 | Cathey | |
| 6,128,443 A | 10/2000 | Higuma | |
| 6,525,302 B2 | 2/2003 | Dowski | |
| 6,842,297 B2 | 1/2005 | Dowski | |
| 6,873,733 B2 | 3/2005 | Dowski | |
| 6,911,638 B2 | 6/2005 | Dowski | |
| 6,940,649 B2 | 9/2005 | Dowski | |
| 6,984,206 B2 * | 1/2006 | Kumei et al. | 600/176 |
| 2002/0118457 A1 | 8/2002 | Dowski | |
| 2002/0195548 A1 | 12/2002 | Dowski | |
| 2003/0057353 A1 | 3/2003 | Dowski | |
| 2003/0086014 A1 * | 5/2003 | Murata et al. | 348/363 |
| 2003/0169944 A1 | 9/2003 | Dowski | |
| 2003/0173502 A1 | 9/2003 | Dowski | |
| 2004/0145808 A1 | 7/2004 | Cathey | |
| 2004/0190762 A1 | 9/2004 | Dowski | |
| 2004/0201701 A1 * | 10/2004 | Takagi | 348/207.99 |
| 2004/0228005 A1 | 11/2004 | Dowski | |
| 2004/0257543 A1 | 12/2004 | Dowski | |
| 2005/0088745 A1 | 4/2005 | Cathey | |
| 2005/0117114 A1 | 6/2005 | Jiang | |
| 2005/0197809 A1 | 9/2005 | Dowski | |

(Continued)

FOREIGN PATENT DOCUMENTS

EP 0814605 A2 12/1997

(Continued)

OTHER PUBLICATIONS

Cathey, W. Thomas et al, *New paradigm for imaging systems*, Applied Optics, vol. 41, No. 29, Oct. 10, 2002, pp. 6080-6092.

(Continued)

*Primary Examiner* — Sinh Tran
*Assistant Examiner* — Selam Gebriel
(74) *Attorney, Agent, or Firm* — Fenwick & West LLP

(57) ABSTRACT

An optical subsystem (e.g., a lens assembly) provides descriptors of the image quality produced by the optics. The descriptors can be communicated to the electrical back-end (e.g., detector plus image processing), which can then automatically adjust the image processing accordingly.

24 Claims, 3 Drawing Sheets

U.S. PATENT DOCUMENTS

2005/0264886 A1 12/2005 Dowski
2009/0185156 A1* 7/2009 Kudo et al. .................... 355/71

FOREIGN PATENT DOCUMENTS

EP 0998124 A2 5/2000
WO WO 2004/063989 A2 7/2004

OTHER PUBLICATIONS

European Search Report, EP06253130, Sep. 26, 2005, 7 pages.

*FixerLabs Focus Fixer*, [online], [Retrieved on Mar. 31, 2006], pp. 1-3, Retrieved from the internet URL:http://www.fixerlabs.com/New_Website/pages/focusfixer.com.

Maeda, Peter Y et al, *Integrating lens design with digital camera simulation*, 5678 SPIE Proceedings SPIE Electronic Imaging, San Jose, CA, Feb. 2005, pp. 48-58.

Fales, C.L. et al., "Imaging System Design for Improved Information Capacity," Applied Optics, Mar. 15, 1984, pp. 872-888, vol. 23, No. 6.

* cited by examiner

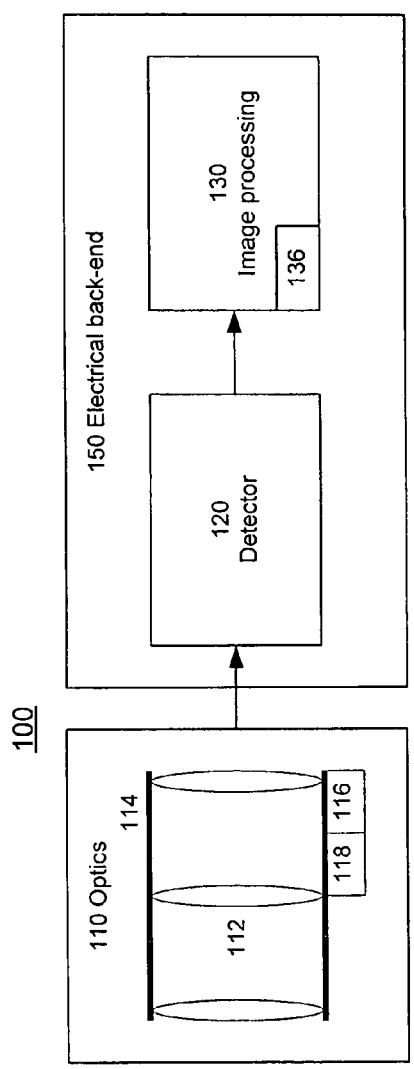
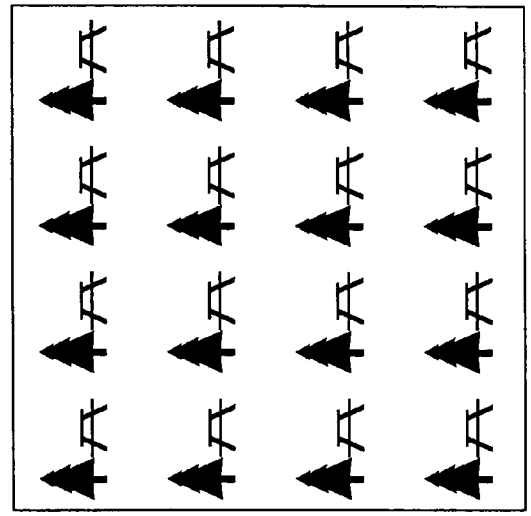
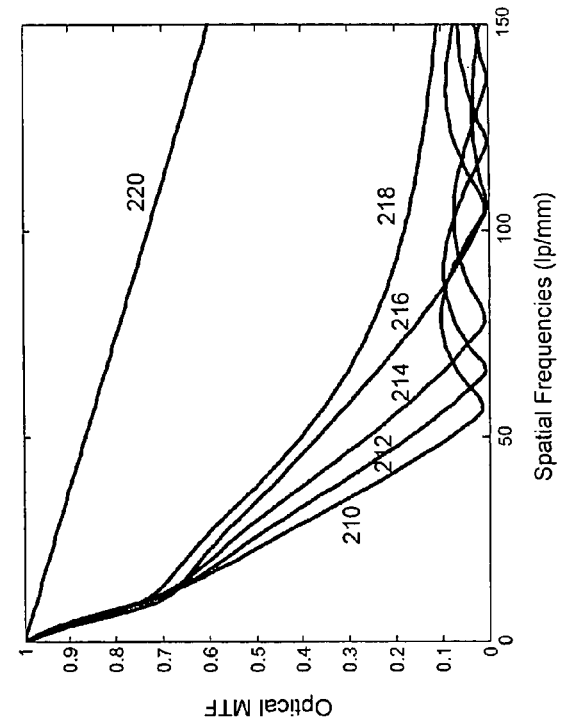

OPTICAL SUBSYSTEM WITH DESCRIPTORS OF ITS IMAGE QUALITY

BACKGROUND OF THE INVENTION

1. Field of the Invention

This invention relates generally to optical subsystems that are used for imaging and, more particularly, to subsystems that provide information about the image quality produced by the subsystem.

2. Description of the Related Art

Electro-optic imaging systems typically include an optical subsystem (e.g., a lens assembly), an electronic detector subsystem (e.g., CCD detector array) and a digital image processing subsystem (e.g., typically implemented in dedicated chips or software). For many commercial imaging systems, the market has developed in a manner where different components are supplied by different vendors. For example, it is not unusual for one set of vendors to provide different types of optical subsystems while a different set of vendors provides the electrical back-end subsystem (i.e., the detector subsystem plus the digital image processing subsystem, if any).

One example is the market for digital cameras. Digital cameras may be assembled from components supplied by different vendors, specifically camera bodies with interchangeable lenses. Likewise, in digital still cameras, such as those found in cell phones, camera integrators commonly buy off-the-shelf lens subsystems on the open market for integration with their back-ends.

This separation of optics vendors from electrical back-end vendors is feasible in part because, under traditional design methods, the optical subsystem is designed independently of the electrical back-end. Typically, the optical subsystem is designed with the goal of forming a high quality optical image of the object. In many cases, the goal is to design a diffraction-limited optical subsystem. As a result, for purposes of designing the electrical back-end, the optical subsystem often can be adequately described solely by parameters that describe the overall imaging scenario: F/#, focal length and conjugate and field size. Standardized mechanical mounts farther facilitate the interchangeability of different optical subsystems and the separate design of optical subsystem and electrical back-end.

One advantage of this separated approach is that companies can specialize in either optical subsystems or electrical back-ends. One vendor might build up expertise in optical subsystems, thus allowing it to produce better quality products at a lower price. Furthermore, if the product has a standardized mechanical mount, it can be used with a number of different electrical back-ends produced by different vendors. This increases the overall volume for the product, further reducing the cost.

However, one drawback of this conventional approach is that synergies between the optical subsystem and the electrical back-end may be lost. For example, a number of vendors may produce competing products with the same F/#, focal length, etc. However, each vendor's product will likely be a different design with different image qualities (e.g., slightly different blurring, distortion, etc.). Furthermore, these image qualities may differ between individual subsystems from the same vendor due to manufacturing variations. However, if the optical subsystem is described simply by its F/#, focal length, etc., the information about image quality will be lost. In some cases, the image processing capability of the back-end may be able to compensate for image degradation caused by the optics but, without information about the image quality, the image processing subsystem will not know what to do.

One example is the market for SLR camera lenses, where multiple lens vendors supply lenses designed to work with a variety of camera bodies. These lenses are interchangeable by the end user. The current image processing subsystems in the camera body rarely, if ever, utilize any information about the quality of the image produced by the lens. This is partly because that information is simply not made available to the image processing subsystem. Instead, the camera body is designed for a "generic" (usually, high quality) lens and uses the corresponding "generic" image processing. The system relies on high performance (and expensive) optics to achieve acceptable performance. There generally is no ability for the image processing subsystem to adapt as a function of the lens attached to the camera body. This is partly because, in order to facilitate interchangeability, lenses are designed to the lowest common denominator. For example, in many cases, this lowest common denominator is diffraction-limited so that the electrical back-end can simply be designed to match diffraction-limited optics.

However, this can be a significant drawback since recent developments demonstrate there can be synergies between the optical subsystem and the electrical back-end. In some cases, a simpler, less expensive, non-diffraction limited lens can achieve the same overall system performance as a diffraction limited lens because the image processing compensates for shortfalls in the lens. The following co-pending patent applications generally concern the end-to-end design of electro-optic imaging systems where the optical subsystem and digital image processing subsystem are designed together to take advantage of synergies between the two: U.S. application Ser. No. 11/155,870, "End-To-End Design Of Electro-Optic Imaging Systems," filed Jun. 17, 2005; Ser. No. 11/245,563, "Joint Optics And Image Processing Adjustment Of Electro-Optic Imaging Systems," filed Oct. 7, 2005; Ser. No. 11/332,640, "End-To-End Design Of Electro-Optic Imaging Systems With Constrained Digital Filters," filed Jan. 13, 2006; Ser. No. 11/433,041, "End-To-End Design Of Super-resolution Electro-Optic Imaging Systems," filed May 12, 2006 and Ser. No. 11/433,780, "End-To-End Design Of Electro-Optic Imaging Systems With Adjustable Optical Cutoff Frequency," filed May 12, 2006. The foregoing are incorporated by reference herein. In these examples, the capabilities of the digital image processing subsystem are leveraged to generate lens systems which are potentially cheaper and/or offer new imaging capabilities. The image processing and optics in these systems are carefully balanced to interact in a beneficial manner.

More generally, one advantage of digital image processing subsystems compared to optical subsystems is that image processing parameters can usually be changed at a relatively low cost. Based on the examples referenced above, there appear to be a number of situations where this characteristic may be exploited in order to increase overall image system quality using tunable digital image processing subsystems that respond to changes in the optical subsystem.

This ability of the image processing subsystem to change depending on the attached lens system will become even more important as the use of non-traditional optical subsystems proliferates. For example, CDM Optics of Boulder, Colo. has developed a specially designed phase plate that is placed at the aperture of the optical subsystem in order to encode the incoming wavefront in a particular way. Digital image processing is used later to reverse the encoding introduced by the phase plate and retrieve certain image content. In another example, researchers in Osaka, Japan built a multi-aperture imaging system which uses a two-dimensional array of optical lenses to generate an array of low quality optical images at the detector plane. The collection of low quality images are combined using digital image processing to create a high resolution image. In this way, a high resolution image can be obtained using a thin optical system. The vendors for these non-traditional optical subsystems may build lens systems to realize the many benefits of interaction between the optics and the image processing, while still desiring to preserve the ability to interoperate with a broad range of electrical back-end subsystems.

Another example of the usefulness of adaptable image processing subsystems is when the lens system may have variable optical properties as a result of user interaction or camera control (e.g. zoom systems, varifocal systems, etc) or other environmental factors. For example, when the user adjusts the lens system, it may be beneficial for the image processing to change correspondingly.

However, in all of these situations, in order for the image processing to make appropriate adjustments, the electrical back-end requires information about the image quality produced by the optical subsystem. Current systems that simply provide F/#, focal length, etc. simply do not provide this information.

SUMMARY OF THE INVENTION

The present invention overcomes the limitations of the prior art by providing an optical subsystem that provides descriptors of the image quality produced by the subsystem. The descriptors can be communicated to the electrical back-end, which can then adjust the image processing accordingly.

In one implementation, the optical subsystem includes one or more optical elements, a housing for the optical elements, and an interface module and a descriptor module. The optical elements (e.g., a lens assembly) form an optical image of an object. The housing contains the optical elements and can be attached to an electrical back-end subsystem and, preferably, has a standardized interface to allow attachment to any of a number of different electrical back-ends. The interface module and descriptor module are contained as part of the optical subsystem, preferably attached to the housing. The descriptor module contains one or more optical image quality descriptors that describe the image quality of the optical image formed by the optical elements. The interface module communicates the optical image quality descriptors to the electrical back-end.

Different types of optical image quality descriptors can be used. For example, the descriptors can be based on a spatial frequency description or Fourier optics description of the image quality, an optical wavefront produced by the optical elements, and/or a conventional geometric optics description of optical aberration. The descriptor information can be encoded in many different ways, for example using various types of compression or decomposition into basis functions. Codes, such as unit serial numbers or bar codes, can also be used as pointers to the descriptor information.

Different types of interface modules and data paths can also be used. In one implementation, the interface module includes an electrical connector that mates to a corresponding electrical connector on the electrical back-end subsystem. In another approach, the communication occurs wirelessly. The interface module may initiate the communication to the back-end or may respond to requests from the back-end. The interface module preferably is standardized to allow communication to different electrical back-end subsystems.

Other aspects of the invention include systems using the devices described above, and methods and applications for these devices and systems.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 1 is a block diagram of an electro-optic imaging system according to the invention.

FIG. 2 is a graph of the MTF of a triplet lens system with adjustable optical cutoff frequency.

FIG. 3 is a geometrically multiplexed image produced by an unconventional imaging system.

Figure 6:
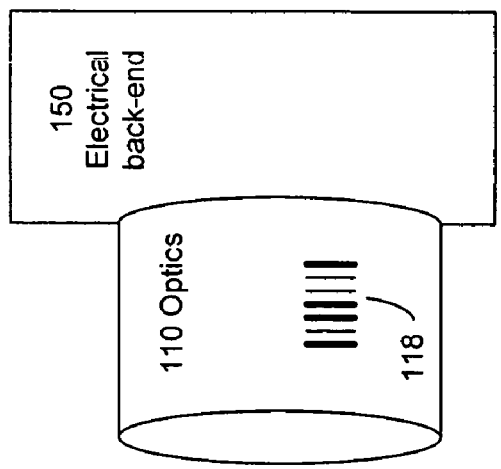
FIG. 6 is a diagram of a lens system with a bar code according to the invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

FIG. 1 is a block diagram that depicts an electro-optic imaging system 100 according to the invention. The system 100 includes an optical subsystem 110 that can be attached to an electrical back-end subsystem 150. The electrical back-end 150 includes a detector subsystem 120 and a digital image processing subsystem 130.

The system 100 is used to capture images of objects. The optical subsystem 110 creates an optical image of the object. The optical subsystem 110 typically is refractive (e.g., a lens system), reflective (e.g., a mirror system) or a hybrid system, although other types of optical elements (such as diffractive or holographic optical elements) can also be used. The optical subsystem 110 can also be designed for various wavelength ranges. Infrared, visible and near ultraviolet are common wavelength ranges of interest. The optical subsystem 110 typically is defined by parameters such as the number, type and shape of the optical elements, the location and size of apertures or stops, etc. Parameters for the imaging scenario, such as F/#, focal length and conjugate and field size, may also be used to describe the optical subsystem 110.

The detector subsystem 120 detects the optical image formed by the optical subsystem 110, converting the image from optical to electrical form. CCD and other detector arrays are common implementations of a detector subsystem 120. The detector subsystem 120 typically can be defined by parameters such as the number of pixels, detector spacing, fill factor, bandwidth, pixel geometry, etc.

Once the captured image is in electrical form, the digital image processing subsystem 130 applies image processing to the image. These techniques can be used to compensate for image degradation introduced by other parts of the system, for example optical blurring, chromatic aberration, or geometrical distortion of the image. They can also be used to further process the captured image, for example by applying filters to sharpen edges (or to smooth edges) or by applying pseudocolor or other enhancement techniques. Pattern matching, matched filtering and other discrimination techniques can also be used to attempt to identify objects of interest. Multi-frame techniques (such as superresolution) or frame-to-frame techniques (such as temporal differences) can also be applied. For conventional digital filters, the digital image processing subsystem may be defined by parameters such as the type(s) of digital image processing to be applied and parameters for that type of processing (e.g., linear or nonlinear filters, number of taps, tap weights, etc).

In FIG. 1, the detector subsystem 120 and digital image processing subsystem 130 are implemented as one component (referred to as the electrical back-end subsystem 150) and the optical subsystem 110 is implemented as a separate component. The optical subsystem 110 can be attached to the electrical back-end 150. For example, the electrical back-end 150 might be a camera body and the optical subsystem 110 a lens system designed for the camera body.

As described previously, the system 100 may be designed so that configuration of the electrical back-end 150 depends on characteristics of the optical subsystem 110. For example, the digital filtering implemented by the digital image processing subsystem 130 may change as a function of the optical transfer function (OTF) or modulation transfer function (MTF) of the optical subsystem 110. Therefore, it would be useful to communicate this type of information between the two components.

Accordingly, in FIG. 1, the optical subsystem 110 includes optical elements 112 that produce the optical image, and a housing 114 for the optical elements. However, the optical subsystem 110 also includes an interface module 116 and a descriptor module 118. The descriptor module 118 contains optical image quality descriptors, which describe the image quality of the image formed by the optical elements 112. The interface module 116 is used to communicate the optical image quality descriptors to the electrical back-end 150. In this particular example, there is a corresponding module 136 on the electrical back-end. This module 136 receives the optical image quality descriptors from the interface module 116. The digital image processing subsystem 130 then adjusts its image processing accordingly.

The optical image quality descriptors are used to describe the image quality produced by the optical elements 112. Quantities such as F/#, focal length and conjugate and field size are not optical image quality descriptors because they generally do not contain information about the image quality. One class of optical image quality descriptors that is well suited for use with digital image processing is the class based on concepts of spatial frequency or Fourier optics. Examples include descriptors based on the MTF or point spread function (PSF) of the optical subsystem. With respect to MTF, a polynomial fit may be applied to the MTF, with the resulting coefficients of the polynomial fit used as the descriptors. Alternately, various points on the MTF curve can be used: the spatial frequency where the MTF first drops to 90%, 50%, 10%, etc.; the spatial frequency above which the MTF is always below 10%, 5%, 1%, etc.; the spatial frequency below which the MTF contains 90%, 80%, etc. of the total energy in the MTF, the MTF value at specific spatial frequencies, etc. The optical image quality descriptors may include a table of spatial frequency vs. MTF, thus describing the MTF curve in its entirety. Analogous concepts can be applied to derive optical image quality descriptors based on the PSF.

FIG. 2 illustrates an example where these types of quantities may make good optical image quality descriptors. This example is taken from FIGS. 10A-10C of U.S. application Ser. No. 11/433,780, "End-To-End Design Of Electro-Optic Imaging Systems With Adjustable Optical Cutoff Frequency," filed May 12, 2006. This example concerns a triplet lens system where the middle optical element can be moved along the optical axis, and the back focal length can also be adjusted. The triplet lens system is designed so that the MTF for the system behaves like a low pass filter, reducing aliasing from higher frequency components. The optical cutoff frequency for the low pass filter can be varied by adjusting the triplet as described above.

FIG. 2 shows the MTF 210-218 of the triplet lens system at five different positions. Curve 220 is the diffraction-limited MTF. These five positions 210-218 were optimized to reduce aliasing at detector pitches of 4, 6, 9, 12 and 15 μm, respectively. Thus, the detector pitches can be used as an optical image quality descriptor for this system. If the electrical back-end has a detector pitch of 9 μm, it can use the descriptor information received from the lens system as feedback to automatically drive the lens system to the optimal setting for 9 μm.

Alternately, the entire MTF curve at various settings can be sampled. This can then be used by the electrical back-end to determine the optimal image processing for a particular MTF curve. In a simplified approach, each MTF curve can be characterized by an optical cutoff frequency, for example the spatial frequency at which the MTF dips down to 20%. This optical cutoff frequency can then be used to adjust the digital image processing subsystem, albeit with assumptions about what the rest of the MTF curve looks like.

Another class of optical image quality descriptors is based on conventional geometric optics descriptions of optical aberrations. Descriptors for optical blurring (e.g., coma, astigmatism, etc., or measures of RMS spot size), chromatic aberration, geometric distortion of the image field (e.g., classic barrel or pincushion distortion), and illumination variation such as caused by vignetting are some examples. Another class of descriptors is based on the optical wavefront produced by the optical subsystem. For example, the wavefront might be represented by Zernike polynomials. Descriptors can also provide wavelength or polarization information about the image, for example if the optical subsystem contains wavelength or polarization filters, including adaptive, variable, or spatially-varying filters.

The optical subsystem 110 may be unconventional. For example, the CDM Optics phase plate introduces an unconventional wavefront coding at the aperture of the optical subsystem. This wavefront coding allows the overall system to achieve greater depth of field, but only if the proper decoding is implemented by the digital image processing subsystem 130. In this example, the optical image quality descriptors could identify the wavefront coding so that the digital image processing subsystem would then know what type of decoding to implement.

As another example, the optical subsystem might be an array of mini-lenses which produces a geometrically multiplexed image of the object (i.e., a geometrically multiplexed image—small images of the object tiled together over the entire field), as shown in FIG. 3. In this case, the optical image quality descriptors could describe the geometric coding for the image, for instance how many small images are formed (N×N) and/or their size or position, or if any of the small images have different gain factors (e.g., some images may be darker than others to better resolve dynamic range), color filters, focal lengths, MTF, or other image-to-image variations. In this way, the electrical back-end 150 will know to process the captured image in a different way than normal.

Figure 5:
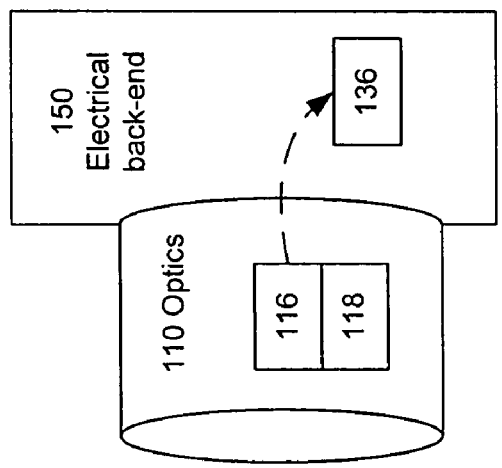
FIG. 5 is a diagram of a lens system with a wireless link according to the invention.
Figure 4:
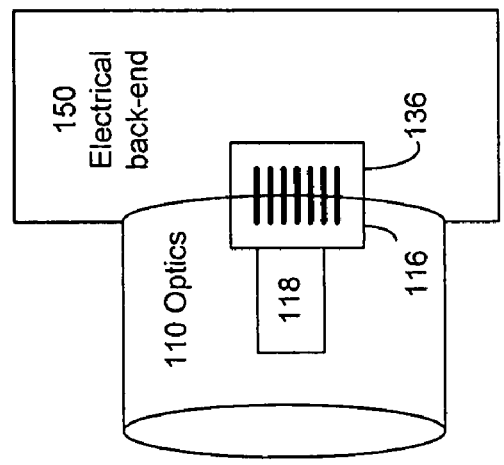
FIG. 4 is a diagram of a lens system with an electrical connector according to the invention.

FIGS. 4-6 illustrate different example mechanisms for communicating the descriptor information between the optical subsystem 10 and the electrical back-end 150. In FIG. 4, the interface module 116 includes an electrical contact that mates with a corresponding contact 136 on the electrical back-end 150 when the optical subsystem 110 is attached to the back-end 150. Data can be communicated between the two components over the electrical path established between the contacts. For example, the optical image quality descriptors might be stored in non-volatile memory 118, and then transferred via the electrical contacts 116 to the electrical back-end 150. The electrical contacts can also be used to provide power to the optical subsystem, for example to power circuitry in the descriptor module 118 or the interface module 116.

In FIG. 5, the interface module 116 includes a wireless transmitter and the communication occurs wirelessly. In one implementation, the transmitter 116 can transfer descriptor information directly to a receiver 136 on the electrical back-end 150. Other data paths are also possible. For example, the transmitter 116 may wirelessly transfer a serial number to a central server, the central server may look up the corresponding descriptor information and then transfer this descriptor information to the electrical back-end 150.

In FIG. 6, there is no interface module. Rather, the optical subsystem 110 contains the optical image quality descriptors in the form of a bar code 118 attached to the optical subsystem. The bar code can be used only for the optical image quality descriptors. Alternately, the bar code can also serve other purposes. For example, the bar code may be a serial number or other identifier, which is also used to identify the optical image quality descriptors. In one approach, the electrical back-end (or other equipment) interrogates the bar code 118 to acquire the descriptor information. In a different approach, a user manually interrogates the bar code 118.

Communication of the descriptor information can be either active or passive for the optical subsystem, and can be initiated by either the optical subsystem 110 or the electrical back-end 150 (or other equipment). In the examples of FIGS. 4 and 5, the optical subsystem 110 is active and initiates the communication of descriptor information to the electrical back-end. FIG. 6 provides a passive example where the optical subsystem is interrogated for the descriptor information. RFID tags are another example of passive devices that can be interrogated for information. In yet another approach, the optical subsystem 110 could supply descriptor information in response to a request from the electrical back-end 150.

Figure 8:
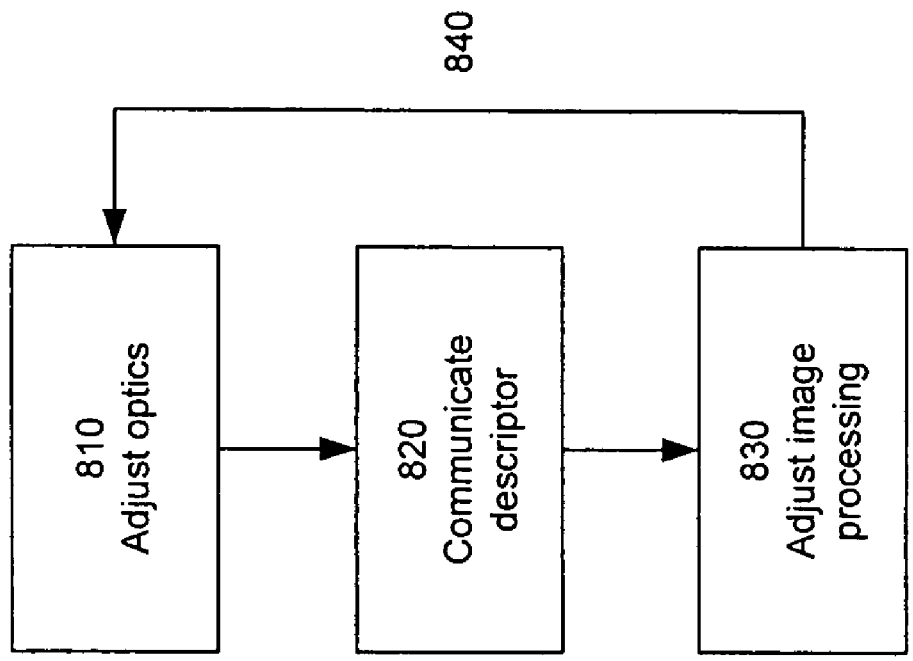
FIGS. 7-8 are flow diagrams of methods for making use of descriptor information according to the invention.
Figure 7:
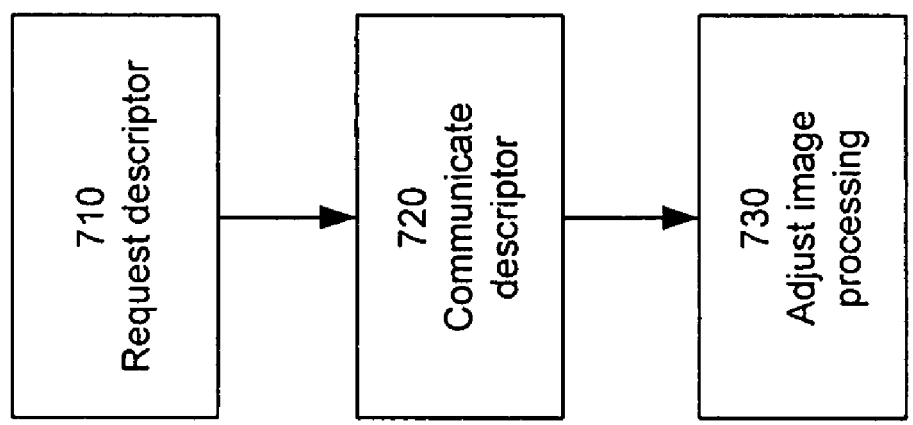

FIGS. 7-8 are flow diagrams of example methods for making use of descriptor information according to the invention. In FIG. 7, optionally in response to a request 710, descriptor information is communicated 720 from the optical subsystem 110 to the electrical back-end 150. This information is then used to adjust 730 the image processing parameters accordingly. This process may occur automatically when the optical subsystem 110 is first attached to the electrical back-end 150. Alternatively, it may occur each time the system is powered up or may automatically repeat on a periodic basis.

FIG. 8 illustrates a dynamic adjustment. In this example, the optical subsystem 110 is adjustable. For example, the optical cutoff frequency may be adjustable, as in the example of FIG. 2. In one approach, the optical subsystem 110 is adjusted 810, possibly manually. The adjustment changes the image quality and the corresponding optical image quality descriptors. As a result, the new descriptor information is communicated 820 to the back-end, which makes corresponding adjustments 830 to the image processing.

This process can be repeated 840 until the desired operating point is reached. If the adjustments are made manually, the process may stop when the user does not make any further adjustments. Alternatively, the entire process could be driven automatically. The user might input a desired endpoint (e.g., a specific cutoff frequency or detector pitch), and the system would then drive both the optical subsystem 110 and the electrical back-end 150 to the desired endpoint.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An electro-optic imaging system comprising:
   an electrical back-end subsystem comprising:
     a detector subsystem coupled to a digital image processing subsystem, the detector subsystem capturing an optical image in electrical form, and the digital image processing subsystem applying image processing to the captured image; and
     a first interface module coupled to the digital image processing subsystem; and
   an optical subsystem for use with the electrical back-end subsystem but separable from the electrical back-end subsystem, the optical subsystem comprising:
     one or more optical elements that form a blurred optical image of an object, the optical image blurred by third order and higher optical aberrations in the optical elements;
     a housing for the optical elements, the housing attachable to the electrical back-end subsystem; and
     a second interface module and a descriptor module attached to the housing, wherein the descriptor module contains one or more optical image quality descriptors that describe an image quality of the blurred optical image formed by the optical elements and the second interface module communicates the optical image quality descriptors to the electrical back-end subsystem via the first interface module;
   the digital image processing subsystem adjusting said image processing to compensate for the blurring caused by the third order and higher optical aberrations, said adjustment based on the received optical image quality descriptors.

2. The electro-optic imaging system of claim 1 wherein the optical image quality descriptors include a spatial frequency description of the image quality.

3. The electro-optic imaging system of claim 1 wherein the optical image quality descriptors include a descriptor for an optical transfer function of the optical elements.

4. The electro-optic imaging system of claim 1 wherein the optical image quality descriptors include an optical cutoff frequency for an optical transfer function of the optical elements.

5. The electro-optic imaging system of claim 1 wherein the optical image quality descriptors include a descriptor for a point spread function of the optical elements.

6. The electro-optic imaging system of claim 1 wherein the optical image quality descriptors include a descriptor for the optical wavefront of the optical elements.

7. The electro-optic imaging system of claim 1 wherein the optical image quality descriptors include a conventional geometric optics description of optical aberration.

8. The electro-optic imaging system of claim 7 wherein the optical image quality descriptors include a conventional geometric optics description of optical blurring.

9. The electro-optic imaging system of claim 7 wherein the optical image quality descriptors include a conventional geometric optics description of chromatic aberration.

10. The electro-optic imaging system of claim 1 wherein the descriptor module contains a code for the optical image quality descriptors and the second interface module communicates the code to the electrical back-end subsystem.

11. The electro-optic imaging system of claim 10 wherein the code is an identifier for the optical subsystem.

12. The electro-optic imaging system of claim 1 wherein the second interface module includes an electrical connector that mates to a corresponding electrical connector on the first interface module.

13. The electro-optic imaging system of claim 1 wherein the first and second interface modules communicate wirelessly.

14. The electro-optic imaging system of claim 1 wherein the second interface module includes a wireless transmitter.

15. The electro-optic imaging system of claim 1 wherein the second interface module is interrogated wirelessly.

16. The electro-optic imaging system of claim 1 wherein the second interface module is passive and the optical image quality descriptors are communicated to the electrical back-end subsystem by active interrogation by the electrical back-end subsystem.

17. The electro-optic imaging system of claim 1 wherein the second interface module transmits the optical image quality descriptors to the electrical back-end subsystem in response to a request by the electrical back-end subsystem.

18. The electro-optic imaging system of claim 1 wherein the first and second interface modules include a standardized interface.

19. The electro-optic imaging system of claim 18 wherein the optical subsystem receives power from the electrical back-end subsystem via the standardized interface.

20. The electro-optic imaging system of claim 1 wherein the optical subsystem is adjustable, adjustment changes the image quality and the corresponding optical image quality descriptors, and the second interface module communicates the changed optical image quality descriptors to the electrical back-end subsystem.

21. The electro-optic imaging system of claim 1 wherein the optical elements include a refractive imaging system.

22. The electro-optic imaging system of claim 1 wherein the optical elements include a reflective imaging system.

23. The electro-optic imaging system of claim 1 wherein the optical elements include a diffractive optical element.

24. The electro-optic imaging system of claim 1 wherein the descriptor module comprises an identifier for the optical subsystem and the identifier also corresponds to the optical image quality descriptors.

* * * * *